United States Patent
Files et al.

(10) Patent No.: US 10,991,524 B2
(45) Date of Patent: Apr. 27, 2021

(54) INFORMATION HANDLING SYSTEM KEYBOARD DISCRETE ROW ILLUMINATION

(71) Applicant: Dell Products L.P., Round Rock, TX (US)

(72) Inventors: Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/380,025

(22) Filed: Apr. 10, 2019

(65) Prior Publication Data
US 2020/0328050 A1 Oct. 15, 2020

(51) Int. Cl.
*H01H 13/83* (2006.01)
*G06F 3/02* (2006.01)
*H01H 13/7065* (2006.01)

(52) U.S. Cl.
CPC .......... *H01H 13/83* (2013.01); *G06F 3/0219* (2013.01); *H01H 13/7065* (2013.01); *H01H 2219/044* (2013.01)

(58) Field of Classification Search
None
See application file for complete search history.

(56) References Cited

U.S. PATENT DOCUMENTS

| 6,776,497 B1 | 8/2004 | Huppi et al. |
| 8,232,958 B2 | 7/2012 | Tolbert |
| 8,915,633 B2 | 12/2014 | Pance et al. |
| 2008/0019117 A1* | 1/2008 | Ng .......................... G02B 6/006 362/85 |
| 2014/0176352 A1 | 6/2014 | Hussain et al. |
| 2014/0226302 A1 | 8/2014 | Shih et al. |
| 2018/0217668 A1 | 8/2018 | Ligtenberg et al. |
| 2020/0064926 A1* | 2/2020 | Chen .................... G02B 6/0088 |

OTHER PUBLICATIONS

ISA/US, Search Report and Written Opinion dated Jun. 19, 2020 for Application No. PCT/US2020/026087, 12 pages.

* cited by examiner

*Primary Examiner* — Ashok Patel
(74) *Attorney, Agent, or Firm* — Zagorin Cave LLP; Robert W. Holland

(57) ABSTRACT

A keyboard integrates a backlight that illuminates keyboard keys with light passing from an edge of the keyboard and along each of plural rows of keys through plural lightguides, each of the plural lightguides disposed under one row of keys. A light source located at the edge of the keyboard membrane provides illumination to the plural lightguides with individual control per row of keys for improved light transmission efficiency.

9 Claims, 3 Drawing Sheets

INFORMATION HANDLING SYSTEM KEYBOARD DISCRETE ROW ILLUMINATION

BACKGROUND OF THE INVENTION

Field of the Invention

The present invention relates in general to the field of information handling system keyboards, and more particularly to an information handling system keyboard discrete row illumination.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically accept inputs from keyboards that associate values, such as letter and number values, with presses at individual mechanical keys. For example, information handling systems commonly accept inputs from QWERTY keyboards that interface with a keyboard controller through a cable or wireless signals. For instance, peripheral keyboards often interface through USB cables and/or Bluetooth wireless signals. A typical keyboard has six rows of keys arranged in a rectangular layout adapted in size to accept inputs from fingers spread across the keyboard surface.

Portable information handling systems often integrate a keyboard in a portable housing. For example, a portable information handling system includes rotationally coupled housing portions so that a base housing portion integrates a keyboard and supports a lid housing portion that integrates a display held in a raised viewing position. Typically, the integrated keyboard attaches to an upper face of the base housing portion and is exposed and ready for use when the housing portions rotate to an open position.

In some usage scenarios, insufficient external light is available to allow an end user to distinguish key values marked on the top of keyboard keys. For instance, some environments in which desktop information handling systems operate have limited ambient light. Similarly, portable information handling systems are often used in low ambient light situations, such as while traveling or at WiFi hotspots. Limited ambient light can make keyboard interactions difficult for end users who struggle to orient their fingers to the base keyboard position.

One solution often found in keyboards of portable information handling systems is to illuminate the keys from below so that key value markings are visible in low ambient conditions. Typical keyboard backlight solutions flood the area underneath keyboard keys so that enough light escapes to illuminate individual key markings. For example, openings distributed across the bottom surface of the keyboard allow light to escape from a flood of illumination at the bottom surface in a controlled manner at the upper surface. One problem with this approach is that a good deal of illumination is wasted in order to provide sufficient illumination across the keyboard bottom surface. Inevitably, some shadows will show up at the keys where illumination escapes in an uneven manner. These shadows tend to be worse where the amount of illumination is limited.

Increased illumination at a keyboard backlight light results in increased power consumption and typically increases the size and weight of the assembled keyboard. In particular, the Z-height of the keyboard tends to increase with the total amount of illumination created by a keyboard backlight. Typical conventional keyboard backlights send illumination against the keyboard bottom surface from a flexible printed circuit board that integrates LED illumination sources. One typical backlight configuration attaches a flexible printed circuit across a central portion of the keyboard to add 0.3 mm to the keyboard height. Another typical backlight configuration attaches a flexible printed circuit board strip along one side of the keyboard to add 0.4 mm to the keyboard height. Other solutions that attempt to distribute LEDs across a keyboard back surface tend to add height and complexity to the keyboard design.

SUMMARY OF THE INVENTION

Therefore, a need has arisen for a system and method which illuminates keyboard keys in an energy and size efficient manner.

In accordance with the present invention, a system and method are provided which substantially reduce the disadvantages and problems associated with previous methods and systems for backlight illumination of keyboard keys. An information handling system keyboard disposes a lightguide under each of plural key rows to transmit light from a light source to the key rows for backlight illumination of the keys.

More specifically, a portable information handling system processes information with processing components disposed in a housing, such as central processing unit (CPU) and memory, and presents the information as visual images at an integrated display. A keyboard integrates in the housing to accept keyed inputs, such as by communicating key touches from membrane to a keyboard controller for use by the CPU. The keyboard includes a backlight disposed below the keys for illumination of the keys, such as when ambient light conditions are low. The backlight includes plural discrete lightguides with each key row of the keyboard having one of the lightguides disposed beneath along the length of keys of the row. A light source disposed at a side edge of the keyboard directs illumination into each of the plural lightguides so that each key row has discrete illumination. A channel defined by each backlight lightguide has a reflective inner surface with openings formed along its length to release illumination proximate to keys of the keyboard with microlenses disposed near the openings to direct illumination to each opening. In one example embodiment, a keyboard controller interfaces with the light source to adapt illumination levels provided to each lightguide based upon conditions at the keyboard, such as type of keyed inputs and rate of keyed inputs.

The present invention provides a number of important technical advantages. One example of an important technical advantage is that a keyboard has a reduced size, weight and power consumption while maintaining illumination levels and even distribution of light across keyboard keys. Segmented illumination to provide keyboard backlight, such as across discrete rows, reduces the overall amount of illumination needed to light individual keys in a uniform manner. More efficient distribution of light reduces power consumption associated with keyboard backlight illumination and decreases the number and size of backlights included in the keyboard for reduced keyboard thickness and size. Individualized control of each keyboard key row's illumination adapts to end user interactions for an improved end user experience and reduced power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system keyboard has discrete illumination provided to key rows. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
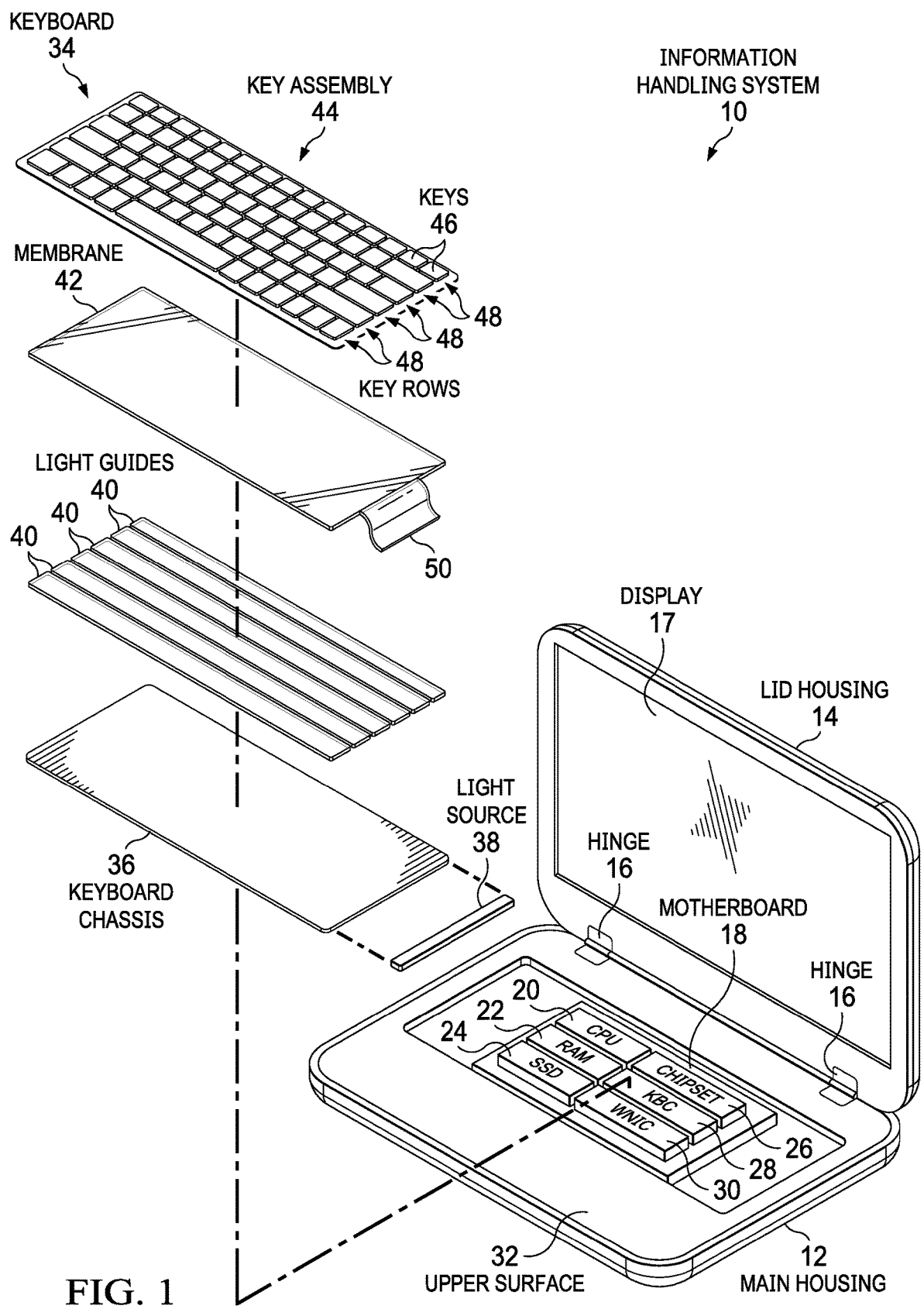
FIG. 1 depicts an exploded view of an information handling system having a keyboard that applies backlight illumination to discrete rows of keys.

Referring now to FIG. 1, an exploded view depicts an information handling system 10 having a keyboard 34 that applies backlight illumination to discrete rows 48 of keys 46. In the example embodiment, information handling system 10 has a portable form factor with a main housing portion 12 rotationally coupled to a lid housing portion 14 by hinges 16. For example, main housing portion 12 and lid housing portion 14 rotate about hinges 16 between a closed position and an open clamshell position so that a display 17 integrated in lid housing portion 14 is held in a raised view position by main housing portion 12. In various embodiments, main housing portion 12 may rotate 360 degrees relative to lid housing portion 14 to convert to a tablet mode. Alternatively, lid housing portion 14 may separate from main housing portion 12 to act as a separate tablet system. In one alternative embodiment, keyboard 34 may reside as a peripheral device that is completely separate from information handling system 10, such as by communicating through a USB cable or with a wireless interface.

In the example embodiment, portable information handling system 10 processes information with processing components disposed in main housing portion 12. For instance, a motherboard 18 couples inside main housing portion 12 and interfaces processing components that cooperate to execute instructions that process information. A central processing unit (CPU) 20 couples to motherboard 18 and executes instructions stored in random access memory (RAM) 22, such as instructions of an operating system and applications retrieved to RAM 22 from persistent storage of a solid state drive (SSD) 24 or other non-transitory storage device. A chipset 26 manages operation of CPU 20, such as clock speed, memory access and presentation of visual information as images presented at an integrated display 17. A keyboard controller (KBC) 28 or other embedded controller interfaces through motherboard 18 to manage power applied to the processing components and input/output device interactions. A wireless network interface card (WNIC) provides a wireless radio interface for communicating with external networks and peripheral devices. In various embodiments, different configurations of hardware and software components may be used in information handling system 10, and information handling system 10 may work with an integrated or peripheral keyboard.

Keyboard 34 assembles over the top of the processing components, such as by coupling to an upper surface 32 of main housing 12. In the example embodiment, keyboard 34 assembles into a keyboard chassis 36 to rest on top of upper surface 32. A light source 38 couples to keyboard chassis 36 to provide illumination for a backlight of keyboard 34. For example, light source 38 has plural light emitting diodes (LEDs) disposed on a flexible printed circuit (FPC) to provide illumination from a side edge of keyboard chassis 36 towards a central position. In one embodiment, light source 38 is disposed outside the perimeter of keyboard chassis 36 so as not to increase the thickness of keyboard 34.

A set of six independent and separate lightguides 40 are disposed on keyboard chassis 36 to accept illumination from light source 38. In the example embodiment, each key row 48 has one lightguide disposed underneath it and each lightguide 40 extends along the length of each key row 48 to transmit light from light source 38 to the opposing side of keyboard chassis 36. Each lightguide 40 directs illumination to keys 46 of each key row 48, such as with openings formed in lightguides 40 below each key 46. Lightguides 40 have a width that is narrower than the width of keys 46 so that along its length, lightguide 40 falls under the footprint of keys 46 to leave spacing between each lightguide 40.

A membrane 42 fits over lightguides 40 and is supported by keyboard chassis 36 to detect key 46 presses with a matrix that reports the key presses at an output interface 50. For instance, a key assembly 44 fits over membrane 42 to align keys 46 with associated input locations. Key assembly 44 biases keys 46 away from membrane 42, such as with a rubber dome, so that an end user press on a key 46 overcomes the bias to hit membrane 42 and report an input through output interface 50. Backlight illumination is fed from light source 38 through each lightguide 40 along each key row 48 to present out at each key 46 so that the key value is visible. Although the example embodiment is described in terms of a mechanical keyboard having a conventional rubber dome assembly, in alternative embodiments alternative types of key touch detection mechanisms may be used with lightguides 40 adapted as appropriate to align under each key row 48.

Figure 2:
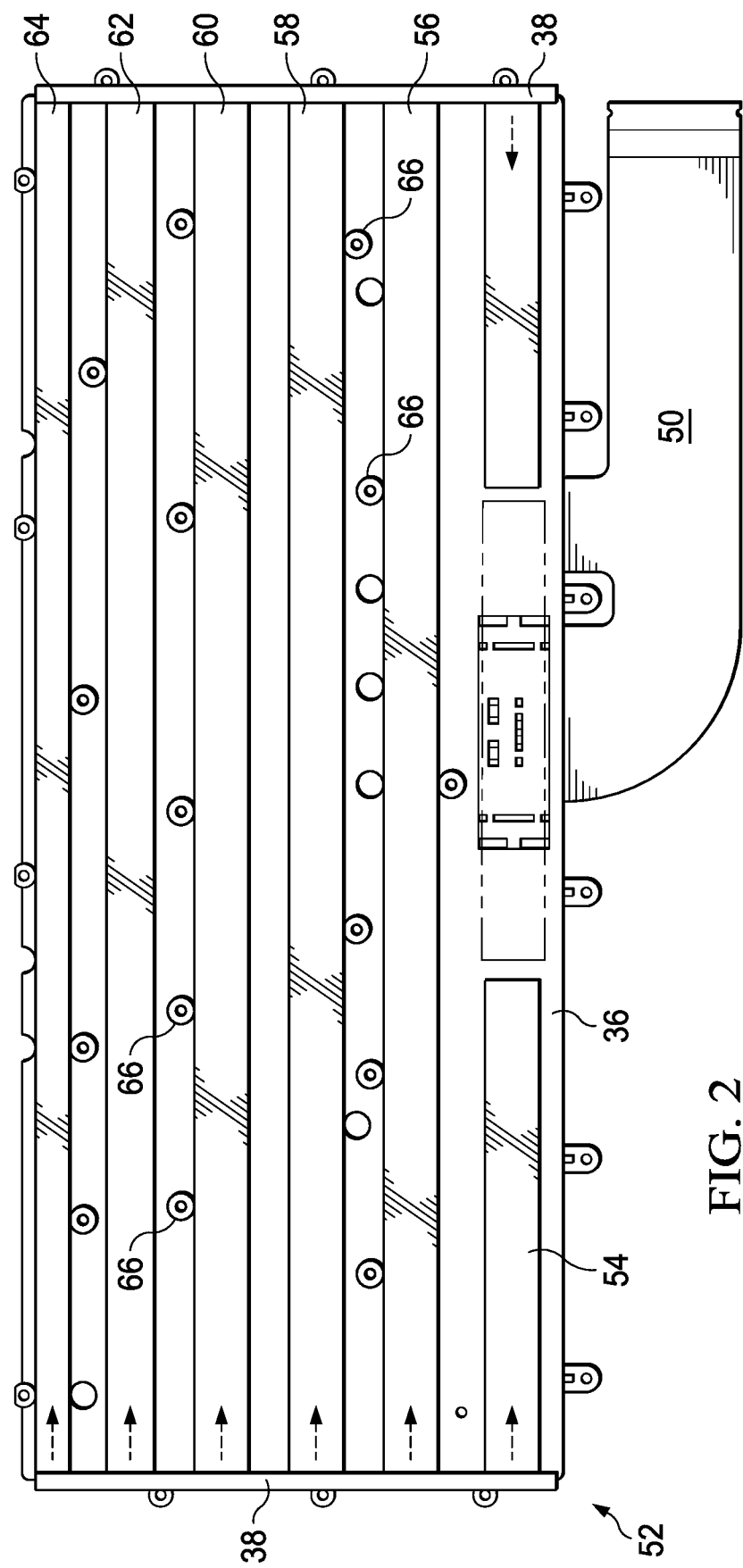
FIG. 2 depicts a bottom view of a keyboard having backlight illumination provided to discrete rows of keys.

Referring now to FIG. 2, a bottom view depicts a keyboard 34 having backlight 52 illumination provided to discrete rows of keys. Light source 38 couples to the edge of the assembly of keyboard 34 to direct illumination towards the center of keyboard 34. For instance, by coupling outside the perimeter of membrane 42, the Z-height of lightguide 38 may be aligned in an area outside of keyboard 34 so that the overall height of keyboard 34 is not increased due to the height of light source 38. In the example embodiment, a spacebar backlight lightguide 54 aligns with the lowest key row starting with the "control" key and having a central space bar key, with first and second portions formed and a second light source 38 providing illumination from an opposing side. Dividing spacebar backlight lightguide 54 into two portions reduces illumination at the space bar key, which is generally identifiable by its size. In addition, a lightguide 38 on both sides of keyboard 34 may be used at just spacebar backlight lightguide 54 or may provide illumination to other lightguides as needed. For instance, where each lightguide 38 has one or more LEDs directing light down specific lightguides 40, illumination from two light sources on opposing ends for less than all the lightguides 40 may highlight certain keys while other keys in other rows having illumination by one light source 38 will have half the relative brightness. In an alternative embodiment, individual LEDs within light source 38 have illumination levels controlled to adapt illumination to different levels at different key rows.

In the example embodiment, five additional lightguides 40 couple to keyboard 34 to align with five additional key rows 48. A shift backlight lightguide 56 aligns underneath a key row that starts with the "shift" key followed by the "Z" key. An anchor backlight lightguide 58 aligns underneath a key row that starts with the "Caps Lock" key followed by the A, S, D, and F anchor keys of the QWERTY keyboard. A tab backlight lightguide 60 aligns underneath a key row that starts with the "Tab" key followed by the "Q" key. A number backlight lightguide 62 aligns underneath a key row that includes numbers 0-9. The uppermost function backlight lightguide 64 aligns underneath a key row that includes function keys. The example embodiment depicts key row alignments associated with a typical information handling system keyboard 34, however, in alternative embodiments other types of key configurations and different numbers of key rows may be supported.

Aligning a lightguide under each key row provides discrete illumination of keyboard keys that help to optimize a keyboard backlight solution. For example, optimizing segmented solutions in rows improves illumination allocation to keys based upon an amount of light needed to illuminated keys under different conditions. Narrow lightguides disposed under each key row have better efficiency for transmitting illumination than does flooding a keyboard undersurface with illumination. For instance, an airgap and reflector system used in between each optimizes light transmission performance to save power with lower illumination levels. Optimized reflectors on three sides of each lightguide without any breaks and a top reflector mask matched to individual key illumination optimizes key lighting to reduce power consumption. This more efficient illumination transmission reduces shadowing at keys to negligible amounts. As depicted in FIG. 2, coupling points 66 that couple keyboard 34 to an information handling system 10 may be disposed between lightguides 40 so that the reflection surface of the lightguides is not broken up or disrupted and the keyboard has greater flexibility at assembly. Further adjusting illumination provided to each lightguide allows variance in illumination across a keyboard.

Backlight illumination managed by discrete individualized illumination of key rows 48 provides a number of operational modes that improve an end user's experience while reducing power consumption. For example, when a keyboard is in an idle state for a predetermined amount of time, illumination of only the anchor key row provides an end user with a visible orientation for hand placement while reducing power consumption. As another example, during different types of inputs, specific rows of keys may have enhanced and/or limited illumination. For instance, during rapid typed inputs of letters, an end users' hands tend to cover the anchor key row so that illumination at the anchor key row and below key rows (i.e., shift and control key rows) may be reduced while upper key rows have an increased illumination that allows the end user to stay oriented. Alternatively, while typing is taking place with greater than a predetermined amount or rate of inputs, the function key row may have illumination limited or shut off, since function keys are not typically input values during rapid letter key inputs. Similarly, a number key row may have reduced illumination while letters are typed and increased illumination as numbers are typed. In one example embodiment, a keyboard controller or other embedded controller monitors inputs made at the keyboard keys with a firmware module to determine variances in keyboard row illumination based upon the type and rate of key inputs. In various embodiments, various other factors may be used to adjust key row illumination to achieve a desired user experience and power consumption.

Figure 3:
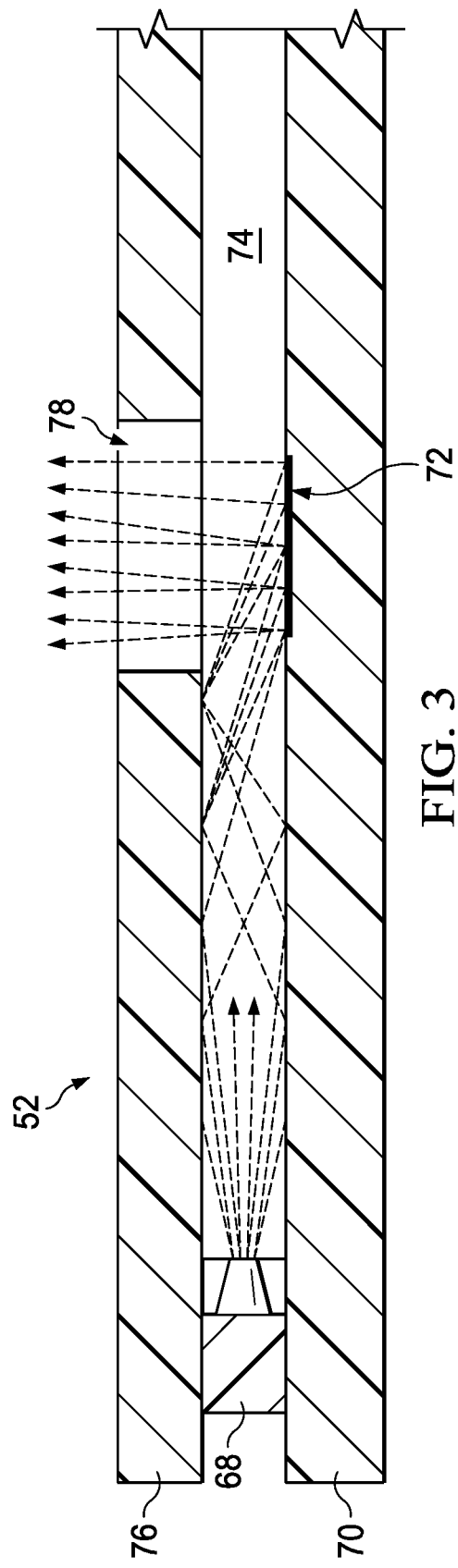
FIG. 3 depicts a side cutaway view of a keyboard backlight having illumination provided to an opening disposed proximate a key.

Referring now to FIG. 3, a side cutaway view depicts a keyboard backlight 52 having illumination provided to an opening 78 disposed proximate a key. In the example embodiment, a single side-oriented LED 68 directs illumination into a lightguide film channel 74 defined on a bottom surface and two side surfaces by a reflector 70 and an upper surface by a reflective front mask 76. Front mask 76 forms openings 78 proximate to keys targeted for illumination. The size of openings 78 may vary based upon a desired amount of illumination with an increased size available at locations more distal LED 68. In the example embodiment, a microlens array 72 of plural microlenses are disposed proximate each opening 78 to reflect light from channel 74 towards opening 78. Directing light from LED 68 through channel 74 with breaks only at openings 78 increases the efficiency of light transmission and reduces shadows that interfere with illumination output. By more effectively directing light to desired exit points, channel 74 provides more even light distribution so that lower illumination levels may be used. In the example embodiment, individual control of LED 68 at each of plural lightguides 40 is supported by a keyboard controller, such as through a GPIO or other control interface.

Although the present invention has been described in detail, it should be understood that various changes, substitutions and alterations can be made hereto without departing from the spirit and scope of the invention as defined by the appended claims.

What is claimed is:

1. A method for illumination of an information handling system keyboard having plural keys aligned in plural rows, the method comprising:
    disposing plural lightguides under the keyboard, at least one of the plural lightguides disposed under each of the plural rows of keys;
    directing illumination into each of the lightguides from a side edge of the keyboard;
    illuminating each key with an opening formed proximate each key in the lightguide disposed under the key;
    detecting inactivity at the plural keys for a predetermined time; and
    in response to the inactivity, directing illumination into only one of the plural lightguides.

2. The method of claim 1 further comprising:
    detecting a predetermined condition; and
    in response to the predetermined condition, providing a greater amount of illumination to one of the plural lightguides than other of the plural lightguides.

3. The method of claim 2 wherein the predetermined condition comprises a predetermined rate of typing letter inputs, the one of the plural lightguides providing a greater amount of illumination comprising the lightguide associated with the row of keys having anchor letters.

4. The method of claim 2 wherein the predetermined condition comprises a predetermined number of number inputs, the one of the plural lightguides providing a greater amount of illumination comprising the lightguide associated with the row of keys having numbers.

5. The method of claim 1 wherein each lightguide defines a channel having an interior with a reflective surface, the channel sized to fall within a boundary of less than the row of keys under which the lightguide is disposed.

6. The method of claim 1 further comprising:
    disposing plural microlenses in the plural lightguides, at least one of the plural microlenses aligned with each key; and
    reflecting illumination from each of the plural microlenses out each of plural openings formed in the channel, at least one of the plural openings aligned with each key.

7. The method of claim 1 further comprising coupling the keyboard to a housing of the information handling system with screws inserted between the plural lightguides.

8. The method of claim 1 wherein illuminating each key further comprises directing illumination from light sources located outside a perimeter defined by a membrane of the keyboard.

9. The method of claim 1 further comprising:
    detecting activity at the plural keys; and
    in response to the detecting activity,
    directing illumination into all of the plural lightguides.

* * * * *